Figure 4:
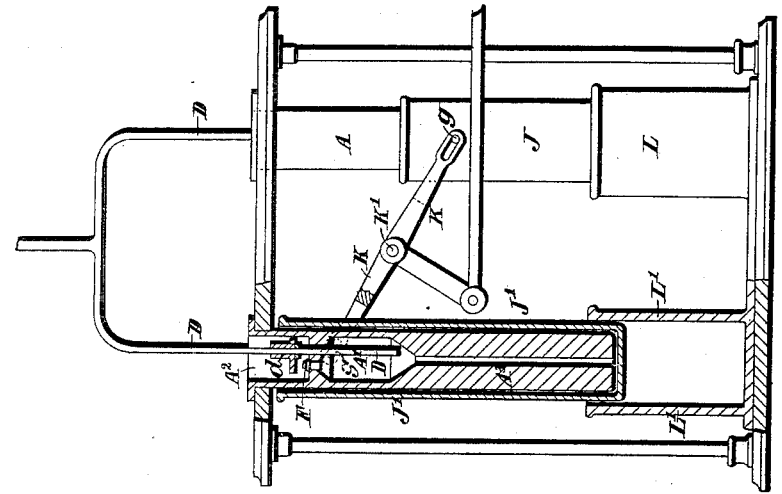

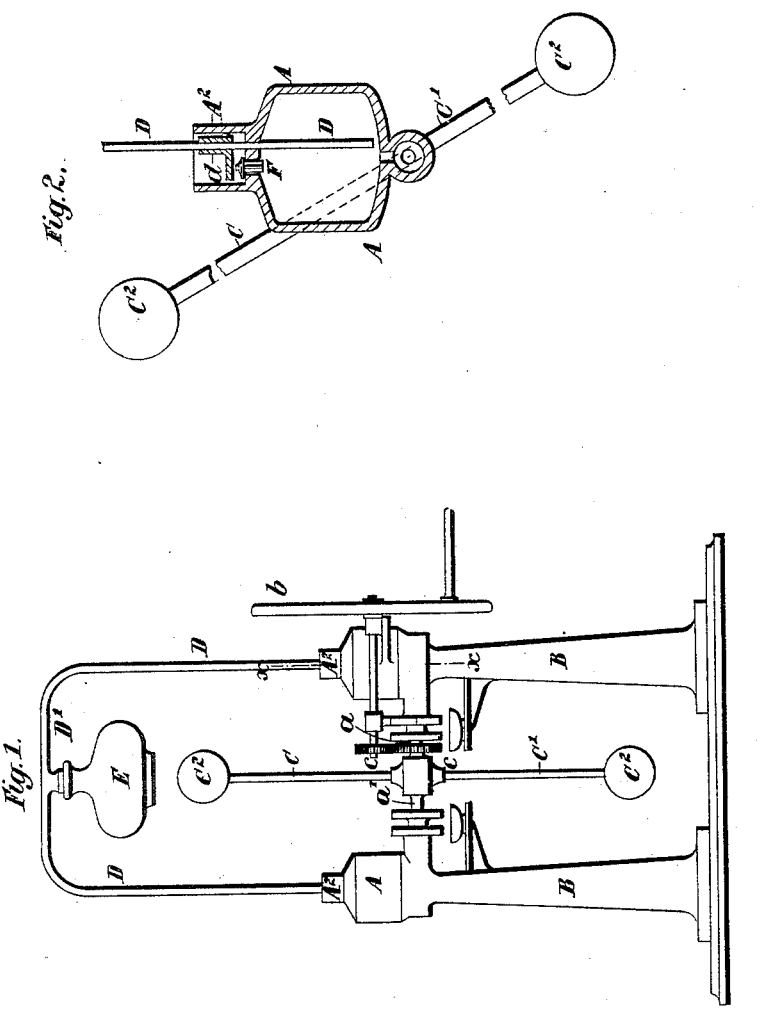

(No Model.) 6 Sheets—Sheet 2.
F. B. HILL.
MERCURY PUMP.

No. 426,184. Patented Apr. 22, 1890.

Witnesses.
J. A. Rutherford.
Robt. Everett.

Inventor
Frederick B. Hill,
By James L. Norris
Atty.

(No Model.)   6 Sheets—Sheet 3.
F. B. HILL.
MERCURY PUMP.
No. 426,184. Patented Apr. 22, 1890.
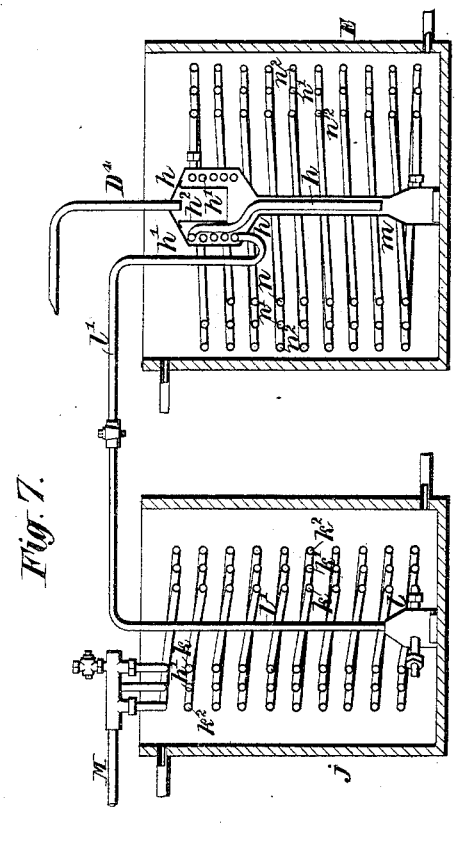
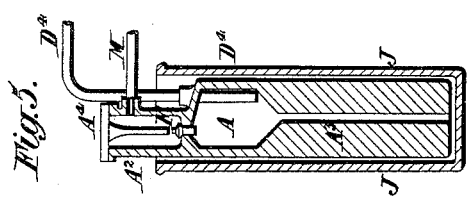
Witnesses
J. A. Rutherford.
Robert Everett.
Inventor
Frederick B. Hill,
By James L. Norris
Atty.

(No Model.)　　　　　　　F. B. HILL.　　　　6 Sheets—Sheet 4.
MERCURY PUMP.
No. 426,184.　　　　　　　　　　Patented Apr. 22, 1890.
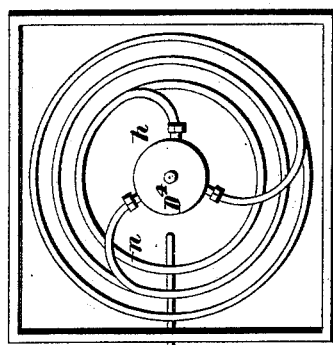
Fig.6.
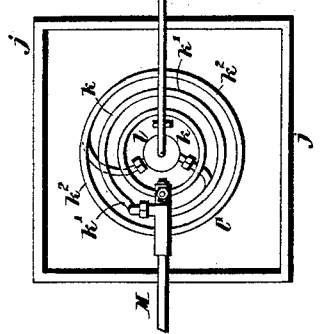
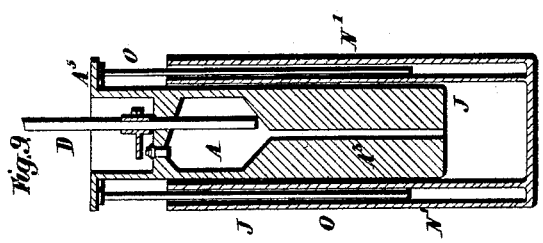
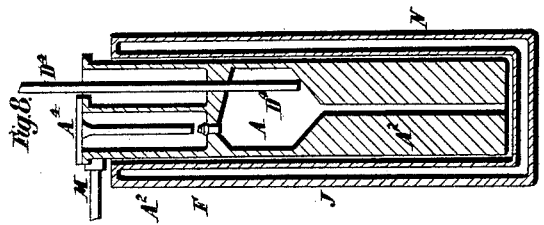
Witnesses.　　　　　　　　　　　　　　Inventor
J. A. Rutherford.　　　　　　　　　　Frederick B. Hill.
Robert Pratt.　　　　　　　　　By James L. Norris
　　　　　　　　　　　　　　　　　　　　Atty.

(No Model.) 6 Sheets—Sheet 5.
F. B. HILL.
MERCURY PUMP.

No. 426,184. Patented Apr. 22, 1890.

Witnesses:
J. A. Rutherford.
Robert Errett.

Inventor:
Frederick B. Hill.
By James L. Norris,
Atty.

(No Model.) 6 Sheets—Sheet 6.

F. B. HILL.
MERCURY PUMP.

No. 426,184. Patented Apr. 22, 1890.

Witnesses
J. A. Rutherford
Robert Everett

Inventor
Frederick B. Hill.
By James L. Norris
Atty.

UNITED STATES PATENT OFFICE.

FREDERICK BARKER HILL, OF LONDON, ENGLAND, ASSIGNOR OF THREE-FOURTHS TO JAMES SINCLAIR, OF SAME PLACE.

MERCURY-PUMP.

SPECIFICATION forming part of Letters Patent No. 426,184, dated April 22, 1890.

Application filed December 27, 1888. Serial No. 294,748. (No model.) Patented in England October 5, 1887, No. 13,487.

*To all whom it may concern:*

Be it known that I, FREDERICK BARKER HILL, engineer, a subject of the Queen of Great Britain, and a resident of London, England, have invented new and useful Improvements in Pumps for Ice-Making and Refrigerating Machines, (for which I have obtained a patent in Great Britain, No. 13,487, bearing date October 5, 1887,) of which the following is a specification, reference being had to the accompanying drawings.

My invention relates to ice-making and refrigerating machines, and comprises various improvements hereinafter described.

One feature of my said invention consists in the employment of mercury in such a manner that it serves as a piston or plunger to draw gases or vapor into and discharge the same from one or more chambers for the purpose of producing a vacuum therein and evaporating the liquid to be cooled or to be used for cooling.

Another feature of my said invention is the construction of the apparatus in such a manner that I am enabled to dispense with a suction-valve, and the mercury will serve as a seal to prevent the return of the gases or vapor from the said chamber or chambers into the refrigerator.

The apparatus is constructed in such a manner that a vacuum is formed in the entire chamber before the mercury uncovers the suction pipe or pipes, thereby insuring the greatest amount of power for drawing gases or vapor from the refrigerator, so that this operation can be effected at very low tension. For cooling or ice-making by a vacuum formed directly on a liquid with or without the aid of sulphuric acid this feature is of great importance. It will be readily understood that if suction-valves are used they must be opened by mechanical means, which are liable to get out of order, and, being internal, are not under the control of the attendant.

The delivery valve or valves in my apparatus are so arranged that they can be seen at work, and the mercury, each time the delivery action takes place, discharges the entire quantity of gases, vapor, or liquid through the delivery-opening and at the same time cleanses the valve and valve-seat. The delivery-valve, when the mercury entirely surrounds it, is made to float, and this action is taken advantage of to allow the quantity of mercury forced through the valve to return after all impurities have floated to the top of the mercury, always, however, leaving enough mercury above the delivery-valve to seal and keep the valve tight against leakage or the entrance of atmosperic air.

Another feature of my said invention is the provision of means for pumping liquid by acting upon a column of mercury in such a manner as to alternately force the said mercury into and withdraw it from one or more chambers for the purpose above specified.

My said invention, moreover, comprises other improvements hereinafter set forth.

Figure 3:
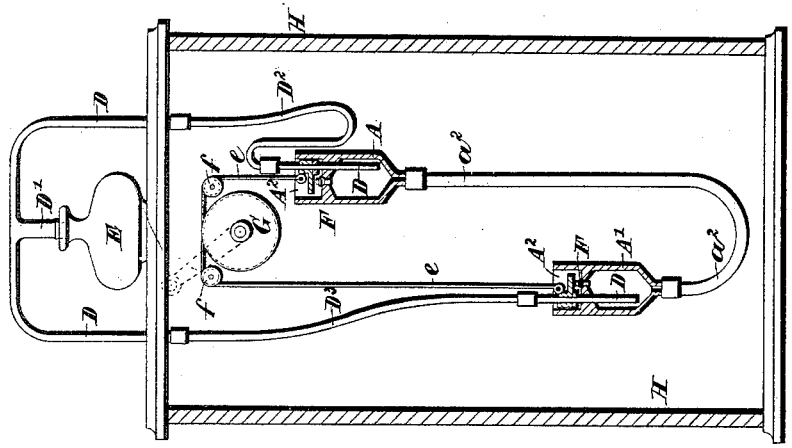
Figure 10:
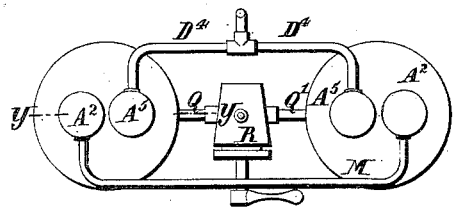
Figure 18:
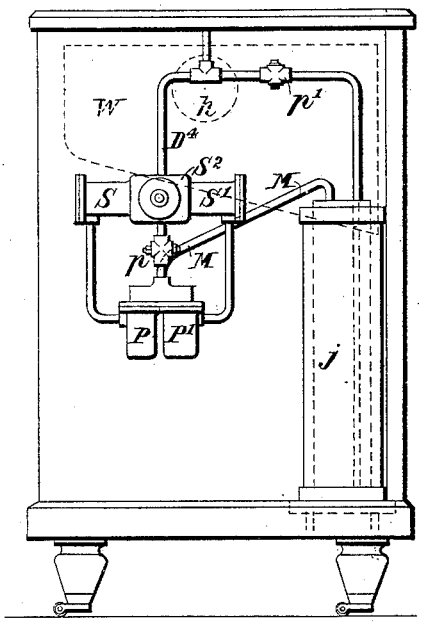
Figure 14:
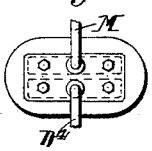
Figure 15:
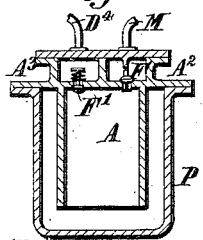
Figure 16:
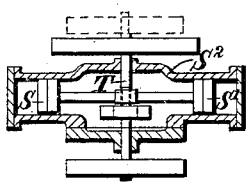
Figure 17:
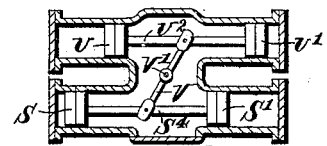
Figure 21:
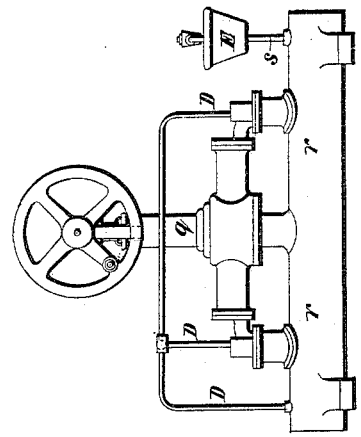
Figure 24:
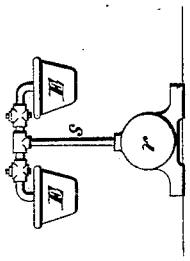
Figure 20:
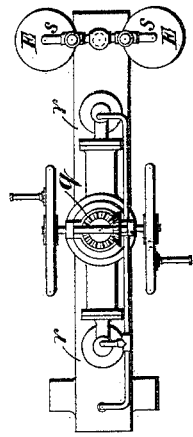
Figure 23:
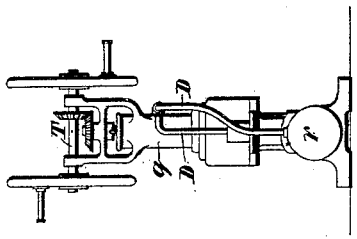
Figure 19:
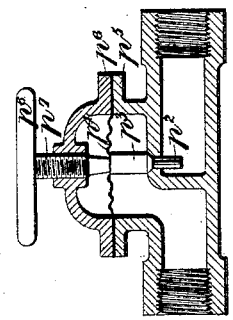
Figure 22:
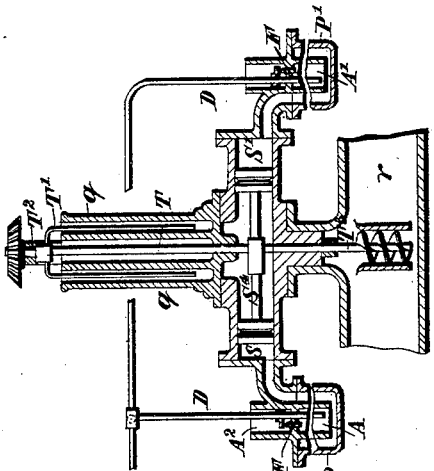

In the accompanying drawings, Figure 1 is a front elevation of one form of my improved ice-making and refrigerating machine. Fig. 2 is a transverse section on the line $x$ $x$, Fig. 1. Fig. 3 is a vertical central section showing another form or modification of the said machine. Fig. 4 is a front elevation, partly in vertical central section, showing another modification thereof. Fig. 5 is a vertical central section showing another modification of my invention. Fig. 6 is a plan, and Fig. 7 a vertical longitudinal central section, of a refrigerator and condenser hereinafter described. Figs. 8 and 9 are vertical central sections showing further modifications of my said invention. Fig. 10 is a plan, Fig. 11 a front elevation partly in vertical section, and Fig. 12 a vertical longitudinal section on the line $y$ $y$, Fig. 10, drawn to an enlarged scale, showing another ice-making and refrigerating machine constructed according to my present invention. Fig. 13 is a vertical longitudinal central section of another ice-making and refrigerating machine constructed in accordance with my said invention. Fig. 14 is a plan, and Fig. 15 a section on the line $x'$ $x'$, Fig. 13, drawn to an enlarged scale, showing details of construction. Fig. 16 is a plan, partly in horizontal section, on the line $y'$ $y'$, Fig. 13. Fig. 17 is a vertical longitudinal central section illustrating another modification of the machine shown in Fig. 13. Fig. 18 is a front elevation showing my improved pump applied to a household refrigerating chamber or safe. Fig. 19 is a vertical longitudinal central section of a stop-valve hereinafter described. Fig. 20 is a plan, Fig. 21 a front elevation, and Fig. 22 a vertical longitudinal central section, drawn to an enlarged scale, showing another form of pump for an ice-making and refrigerating machine constructed according to my said invention. Fig. 23 is an elevation of one end of the said machine, and Fig. 24 is an elevation of the other end thereof, some of the parts being removed.

Like letters indicate corresponding parts throughout the drawings.

According to one part of my said invention, I provide improved means for cooling liquids by evaporation with or without the aid of sulphuric acid.

Figs. 1, 2, 3, and 4 show modifications of my said invention, wherein mercury is used in such a manner that it will form a perfect vacuum and discharge any gases or liquids into and against the pressure of the atmosphere with the use of a delivery valve or valves only—that is to say, without a suction-valve.

Referring to Figs. 1 and 2, A A' are chambers, which are mounted upon suitable standards B and are connected, respectively, with hollow rods or arms C C' by means of pipes $a$ $a'$, extending through stuffing-boxes into the said chambers. These pipes serve as a shaft or axle about which the said arms may be rocked or turned by means of a hand-wheel $b$, connected by gear-wheels at $c$ or by other suitable means to the said pipe for the purpose hereinafter specified. The hollow rods or arms C C' terminate in hollow balls $C^2$. D is a pipe extending into the chambers A A' and provided with a short branch D', to which is to be applied the vessel or receptacle E for containing the liquid to be cooled. The pipe D passes through the top of each of the pump-chambers A A' and terminates near the bottom of the said chambers, as shown in Fig. 2. To prevent leakage around the said pipe where it passes through the top of the chamber, I provide a cup $A^2$ for containing mercury, as hereinafter described. Each of the said chambers is provided with a valve F for the outlet or discharge of gases or liquid, which valve is also sealed by the mercury in the cup $A^2$. The lift of this valve is regulated by means of a stop $d$, which is adjustable upon the pipe D, being so fitted thereon that it will remain in any position to which it may be adjusted. Into each of the chambers A A' is poured a quantity of mercury, so that when the hollow rod or arm connected with the said chamber extends downward therefrom the mercury will fill the said arm and its hollow ball $C^2$ and also the lower portion of the said chamber up to a level below the end of the pipe D.

The operation of the machine shown in Figs. 1 and 2 is as follows, viz: When the arms C C' are partially rotated alternately in either direction or are rotated continuously in one direction, the mercury flows alternately from each of the pump-chambers A A' into the corresponding hollow arm and back to the said chamber, thus acting as a piston or plunger to draw air or vapor from the vessel E through the pipe D into the said chamber and discharge it through the valve F. The mercury must descend a considerable distance in the chamber before uncovering the end of the suction-pipe D. Therefore when the said pipe is thus opened a sudden and powerful action will be produced, tending to draw the gas or vapor from the vessel E, which action is very favorable in promoting the evaporation of the liquid in the said vessel. The parts are so constructed and arranged that while the mercury in one of the said pump-chambers A A' is flowing therefrom and drawing air or vapor from the vessel E the mercury in the hollow arm connected with the other of the said chambers will be flowing into the latter and discharging therefrom the air or vapor previously drawn into it. The apparatus therefore operates as a double-acting pump.

It will be seen that the mercury in the chambers A A' will cover and uncover the ends of the pipe D at the proper times, thus preventing the return of the gas or vapor through the said pipe. I am therefore enabled to dispense with an inlet-valve, thus obviating the resistance to be overcome in opening such valve and insuring freedom of entrance of the gas or vapor into the chamber.

The capacities of the pump-chambers A A' and arms C C' are preferably so proportioned that when either of the said arms extends upward from the corresponding chamber the level of the mercury will be above the outlet or discharge valve F. Therefore the said valve will be caused to float upon the mercury, which will cleanse the valve and valve-seat, and the impurities will float on the top of the mercury, and when the mercury is allowed to flow from the chamber into the arm a small quantity thereof will remain in the cup $A^2$ and will form a seal above the said valve and around the pipe D, thus effectually preventing leakage of air into the said chamber and preventing the return of the impurities into the said chamber. It will be seen, moreover, that the only valve which I employ in combination with each chamber—viz., the delivery-valve F—is readily accessible from the exterior of the said chamber, the stop $d$ being very easily raised upon the pipe D.

In the modification of my invention shown in Fig. 3 the pump-chambers A A' are suspended from a cord or chain $e$, passed around a pulley G and over guide-pulleys $f$, and the said chambers are connected by means of a flexible pipe or tube $a^2$. The pipe D is, moreover, provided with flexible parts $D^2 D^3$. By means of the pulley G the two chambers can be alternately raised and lowered, so that the mercury will flow alternately from the chamber A into the chamber A′, and vice versa, thus forming a double-action pump with one quantity of mercury. The said chambers and the pulleys and flexible pipes are inclosed in a box or casing H.

In the modification of my invention shown in Fig. 4 I provide each of the pump-chambers A A′ with an extension $A^3$, and I combine with the said chambers casings or cylinders J J′, arranged to be moved up and down by means of a lever K, pivoted at K′ to the frame of the machine, and connected with the casings or cylinders J J′ by means of pins or studs $g$, fixed in the said cylinders and extending into slots in the said lever K. This lever may be operated by hand or by any suitable mechanism. When the cylinders occupy the position shown, mercury is poured into the chamber A′ until the said mercury, filling the said chamber and the cylinder J′, rises to a level a short distance above the valve F. If the cylinder J′ be then moved downward and the cylinder J simultaneously raised, the mercury will flow from the chamber A′ into the said cylinder J′, and gas or vapor will be drawn through the pipe D into the said chamber. On raising the cylinder J′ mercury will be displaced therefrom by the extension $A^3$ and will be forced into the chamber A′, thus expelling the gas or vapor therefrom through the valve F. The chamber A is charged with mercury, and the said chamber and its casing J operate in a similar manner to that above described, gas or vapor being discharged from one chamber while it is being drawn into the other chamber. The cylinders J J′ are arranged to descend into cylinders or cylindrical guides L L′.

When the machine is to be used with ether or other agents requiring a low pressure for liquefaction, I sometimes modify the construction of the apparatus, as shown in Fig. 5 or in Fig. 8.

In the modification of my apparatus illustrated in Fig. 5 the pump-chambers A A′ are each connected by a pipe $D^4$ with the refrigerator and by a pipe M with the condenser, and the cup $A^2$ is closed at the top by a cover $A^4$.

In Figs. 6 and 7, $h$ is the refrigerator, which is situated within the vessel E′ for containing the liquid to be cooled. $j$ is the condenser, which has three (or any other suitable number of) coils $k\ k'\ k^2$, connected at their upper ends with the pipe M, and at their lower ends with a central chamber $l$. A pipe $l'$ extends from this chamber $l$ to a coil $h'$ in the refrigerator $h$. This coil is connected by a pipe $h^2$ with a chamber $m$, to which are also connected three coils $n\ n'\ n^2$, the upper ends of which are connected with the refrigerator $h$ at or near the top thereof. The refrigerator $h$ has an internal tube $h^3$ extending from the top nearly to the bottom thereof, and the pipe $D^4$ is connected to the upper end of the said refrigerator. Liquid is contained in or, if desired, caused to circulate through the vessel $j$ for cooling the coils $k\ k'\ k^2$, the chamber $l$, and pipe $l'$. The gas drawn from the refrigerator through the pipe $D^4$ by one or other of the pumps herein described is forced through the pipe M into the coils of the condenser $j$ with sufficient pressure to insure the condensation or liquefaction of the gas. It passes from the said coils into the chamber $l$, and through the pipe $l'$ into the coil $h'$ of the refrigerator, whence it passes into the chamber $m$ and through the coils $n\ n'\ n^2$ into the space between the outer casing and the inner tube $h^3$ of the refrigerator $h$. As the pressure is diminished, the gas again expands and extracts heat from the liquid in the vessel E. The said gas is then again drawn from the refrigerator through the pipe $D^4$ by the pump. I sometimes inclose the cylinders J J′ in a casing or jacket N, Fig. 8, through which the liquid is to be circulated for the purpose of cooling the mercury.

In the modification of my invention shown in Fig. 9 I inclose each of the said cylinders in a receptacle N′, in which I place a quantity of mercury, and I provide a tube O, which is secured to a flange $A^5$ at the upper end of the cup $A^2$. This tube extends downward into the mercury in the said receptacle N′. A vacuum may, if desired, be formed in the upper end of the tube O, which will tend to counterbalance the apparatus.

Figure 11:
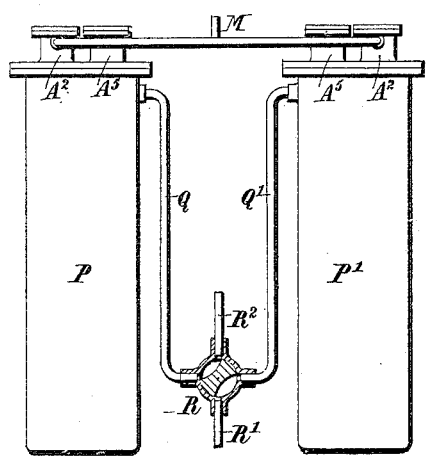
Figures 12, 13:
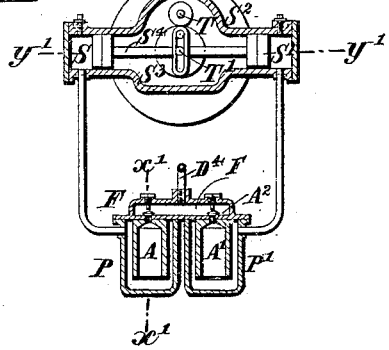

Figs. 10, 11, and 12 show another modification of my invention, wherein I avoid the great difficulty of construction and cost of compression-pumps as heretofore made for use with ammoniacal gas. For this purpose I employ mercury, to which motion is imparted by means of a hydraulic pump or pumps. I can use for this purpose hydraulic pumps of small diameter running at a high speed, thus obtaining the best result from the steam-engine or other motor employed, while permitting a long and steady stroke of the mercury. These hydraulic pumps may be placed at any desired distance from the refrigerator. By using mercury in this manner, moreover, I avoid the expense of boring and turning the parts and the risk arising from the use of a material of a porous nature, and at the same time I effect a great saving in power by the reduction of friction, there being no pistons or glands, and I insure an absolute discharge at each stroke and obviate the liability to leakage of gas. I am also enabled to effect the perfect cooling of the pump and the mercury by the use of a jacket through which cold water is caused to circulate. By this arrangement the surface exposed to the cooling-water can be made to suit any requirements, which is a very important advantage in the case of pumps for refrigerating and ice-making. In this modification of my invention the pump-chambers A A′ are firmly secured in cylinders P P′, containing mercury, and each of the said chambers is provided with a suction-valve F' and a delivery-valve F, which are inclosed in cups $A^2$ $A^5$, provided with covers $A^4$ $A^6$, so that they are readily accessible when the said covers are removed. The cups $A^5$ are connected by pipes $D^4$ with the refrigerator, and the cups $A^2$ are connected by pipes M with the condenser. The cylinders P P' are connected by pipes Q Q' with a cock R, whereby the said cylinders may be placed in communication alternately with a pump or accumulator through the pipe R' and with the exhaust or discharge pipe $R^2$. The mercury in the cylinders P P' is thus caused to alternately rise and fall in the pump-chambers A A'. A valve or other suitable device may be substituted for the cock R. Water-jackets $P^2$ are, moreover, in some instances provided on the cylinders P P'.

Figs. 13 to 16 show another modification of my said invention, wherein I employ a cheap and powerful pump, which may be worked by hand or other power. This form of my apparatus is adapted for a household refrigerator or ice-making machine and also for cooling refrigerating-chambers. It is arranged to accumulate power by driving a fly-wheel at a high speed for the greater portion of the stroke, and thus accumulating power, which is utilized at the termination of each stroke to effect the heavier portion of the work. In smaller sizes of the apparatus this fly-wheel may be dispensed with. In this modification of my said invention I employ pistons or plungers S S', working in cylinders and adapted to act, through the medium of water, oil, glycerine, or other suitable liquid, upon the mercury in the cylinders P P' to cause the same to rise and fall in the pump-chambers A A'. The pistons or plungers S S' are arranged to be driven through the medium of a shaft T, extending through stuffing-boxes or journal-bearings in the sides of the casing $S^2$, and connected by means of suitable gearing with a crank-shaft T', which is supported in bearings within the said casing, and the pin of which works in a slot $S^3$ in the piston-rod $S^4$ or the said pistons or plungers may be driven in any other convenient manner. When the shaft T is passed through stuffing-boxes, the casing $S^2$ may be filled with water or other liquid.

Fig. 17 shows a direct-acting water-motor attached to a pump similar to that shown in Figs. 13 to 16. This form of my apparatus is very convenient for household-refrigerators, as it can be regulated to run at a very low speed, just fast enough to overcome the loss through radiation from the refrigerator.

The water-motor shown in Fig. 17 comprises cylinders U U', the pistons in which are fixed upon a common piston-rod $U^2$, connected by a lever V, pivoted at V', with the piston-rod $S^4$.

Fig. 18 shows an apparatus constructed as shown in Fig. 13, and applied to a household refrigerator or safe having a cold-storage tank, which is designed to contain a large quantity of non-congealable liquid sufficient to maintain the desired low temperature for many hours after the apparatus has ceased working, and in which cold-producing agents are vaporized, as explained in the specification of former Letters Patent granted to me in England and dated December 6, A. D. 1886, No. 15,914, or in any other convenient manner. This arrangement permits of the refrigerator being left for many hours without working or without attention. W is the storage-tank; $h$, the refrigerating device; $j$, the condenser. $p$ $p'$ are stop cocks or valves for regulating or controlling the flow of the gas. The other forms or modifications of my improved pump may also be applied, in combination with a condenser and storage-tank, to a household refrigerator or safe in a similar manner.

The improvements above described with reference to Fig. 18 are obviously applicable to large or small refrigerating-chambers.

Fig. 19 shows a stop-valve of the kind which I prefer to use at $p$ and $p'$ to avoid the liability to leakage. The stem $p^3$ of the valve $p^2$ is in contact with the under side of a corrugated diaphragm $p^4$, tightly held or cramped between flanges $p^5$ $p^6$. A screw-spindle $p^7$ is provided above the said diaphragm and is adjustable by means of a hand-wheel $p^8$ to open or close the valve. By this arrangement I am enabled to hermetically seal the entire machine.

Figs. 20 to 24 show another modification of my said invention adapted for machines in which sulphuric acid is to be used. It is designed to overcome the defects of machines at present in use constructed on this principle by dispensing with all glands and avoiding the risk of admitting atmospheric air into the machine while at work. This is of great importance, as a small leakage into the machine immediately stops its action. This machine is, moreover, of cheap construction, and can very easily be moved from place to place without risk of its getting out of working order. It may be provided with wheels to render it more easily portable. In this modification I employ pistons or plungers S S', adapted to act through the medium of water or other liquid upon the mercury in the cylinders P P' to cause the same to rise and fall in the pump-chambers A A'. The said pistons or plungers are arranged to be driven through the medium of the shaft T, extending through a vessel $q$, which is annular in transverse section and which contains mercury for the purpose of forming an absolute seal against the admittance of atmospheric air and a frictionless gland. The shaft T has a tube T', with a solid end made air-tight at $T^2$ on the said shaft and dipping into and free to revolve in the mercury. Any vacuum formed in the center of the vessel or casing $q$ will cause the mercury to fall in the outer division formed by the tube T' and to rise in the inner division, according to the vacuum formed. I sometimes employ a similar arrangement to that above described for forming a seal around the stem or spindle of a valve or cock. The shaft T extends into the vessel $r$ for driving a worm $T^3$ or other suitable appliance for circulating the sulphuric acid by raising it from the bottom to the top of the acid-chamber, thereby changing the surface of the acid which comes in contact with the vapor of water, which the acid quickly absorbs. The vapor of water is drawn from the vessels E, containing the water to be frozen or cooled, through the pipe $s$, over the surface of the sulphuric acid in the vessel $r$. All the vapor of water or air not absorbed will be drawn up the suction-pipe D into the chambers A A' and expelled into the atmosphere through the delivery-valves F. These valves are sealed with mercury, as above described.

All of the pumps above described are applicable to refrigerating or ice-making machines wherein the cooling is effected by the evaporation of the liquid to be cooled, or to be used for cooling, with or without the aid of chemical agents, such as ether, ammonia, or sulphuric acid.

What I claim is—

1. A mercury-pump comprising a chamber provided with a delivery-valve in the upper part thereof and with a valveless suction-pipe terminating near the bottom thereof, so that the mercury will close or seal the said pipe, substantially as described.

2. A mercury-pump comprising a chamber provided with a delivery-valve in the upper part thereof and with a valveless suction-pipe terminating near the bottom thereof, so that the mercury will close or seal the said pipe, the said chamber being provided with a water-jacket to prevent heating of the mercury, substantially as described.

3. A mercury-pump comprising a chamber provided with a delivery-valve in the upper part thereof and with a valveless suction-pipe terminating near the bottom thereof, so that the mercury will close or seal the said pipe, the lift of the delivery-valve being limited by an adjustable stop-piece, substantially as described.

4. A mercury-pump comprising a chamber provided with a delivery-valve in the upper part thereof, a valveless suction-pipe terminating near the bottom thereof, so that the mercury will close or seal the said pipe, and a body of mercury sufficient to fill the said chamber and form a seal over the said delivery-valve, substantially as described.

5. In a mercury-pump, the combination, with a pump-chamber, of a valveless suction-pipe D, extending to near the bottom of the same, a delivery-valve F, arranged in a cup or vessel at the upper end of the said chamber, and a stop $d$, adjustably secured upon the said suction-pipe, substantially as set forth.

6. The combination, with a pump-chamber for containing mercury, a valveless suction-pipe, and a delivery-valve arranged in a cup or vessel at the upper end of the said chamber, of a piston or plunger S, arranged to act upon the said mercury through the medium of water or other liquid, substantially as and for the purposes described.

7. The combination of the pump-chamber, the valveless suction-pipe D, the delivery-valve F, arranged in a cup or vessel at the upper end of the said vessel, a piston or plunger S, arranged to act upon the said mercury through the medium of water or other liquid, and means, substantially as above described, for imparting reciprocating motion to the said piston or plunger, substantially as and for the purposes set forth.

8. In a mercury-pump, the combination, with a pump-chamber for containing mercury and provided with a suction-pipe and with a delivery-valve arranged in a cup or vessel at the upper end of the said chamber, of a piston or plunger S, arranged to act upon the said mercury through the medium of water or other liquid, substantially as and for the purposes described.

9. In a mercury-pump, the combination of the pump-chamber, the suction-pipe D, the delivery-valve F, arranged in a cup or vessel at the upper end of the said vessel, a piston or plunger S, arranged to act upon the said mercury through the medium of water or other liquid, and means, substantially such as above described, for imparting reciprocating motion to the said piston or plunger, substantially as and for the purposes set forth.

In testimony whereof I have hereunto signed my name in the presence of two subscribing witnesses.

FREDERICK BARKER HILL.

Witnesses:
  DAVID YOUNG,
  A. E. NIXON.